(12) United States Patent
Kurosawa et al.

(10) Patent No.: US 9,956,480 B2
(45) Date of Patent: May 1, 2018

(54) SERVER DEVICE AND SERVER PROGRAM

(71) Applicant: KABUSHIKI KAISHA SEGA, Tokyo (JP)

(72) Inventors: Hiroyuki Kurosawa, Tokyo (JP); Manato Ito, Tokyo (JP)

(73) Assignee: KABUSHIKI KAISHA SEGA, Tokyo (JP)

( * ) Notice: Subject to any disclaimer, the term of this patent is extended or adjusted under 35 U.S.C. 154(b) by 365 days.

(21) Appl. No.: 14/616,798

(22) Filed: Feb. 9, 2015

(65) Prior Publication Data

US 2015/0151203 A1 Jun. 4, 2015

Related U.S. Application Data

(63) Continuation of application No. PCT/JP2013/072985, filed on Aug. 28, 2013.

(30) Foreign Application Priority Data

Aug. 30, 2012 (JP) ................................ 2012-190454

(51) Int. Cl.
*A63F 13/00* (2014.01)
*G06Q 30/00* (2012.01)
(Continued)

(52) U.S. Cl.
CPC .............. *A63F 13/35* (2014.09); *A63F 13/71* (2014.09); *G06Q 30/0209* (2013.01);
(Continued)

(58) Field of Classification Search
CPC ................................ A63F 13/00; G06Q 30/00
See application file for complete search history.

(56) References Cited

U.S. PATENT DOCUMENTS

2004/0148229 A1    7/2004  Maxwell
2005/0177386 A1*   8/2005  Essa ..................... G06Q 30/02
                                                     705/5
(Continued)

FOREIGN PATENT DOCUMENTS

JP    2002-259791    9/2002
JP    2003-196420    7/2003
JP    2003-199977    7/2003

OTHER PUBLICATIONS

[Final Fantasy Airborne Brigade] Introduction to Final Fantasy released on mobile and Notice of pre-registration events!! Naver Blog Post, Aug. 25, 2012 <http://blog.naver.com/PostPrint.nhn?blogId=deathzombi&logNo=100164015658> 5 pages, with Partial English Translation.
(Continued)

*Primary Examiner* — James S McClellan
*Assistant Examiner* — Syvila Weatherford
(74) *Attorney, Agent, or Firm* — IPUSA, PLLC

(57) ABSTRACT

A server device is provided that includes a registration unit configured to accept information identifying a target application for pre-registration and information identifying a user from a terminal device and register the accepted information, and a providing unit configured to provide registration information to a management service for performing a verification with respect to the information identifying the target application and the information identifying the user accepted from the terminal device after the target application is released. The registration information may be provided in a batch or each time the verification is performed.

6 Claims, 17 Drawing Sheets

(51) Int. Cl.
    *A63F 13/35*       (2014.01)
    *G07F 17/32*       (2006.01)
    *A63F 13/71*       (2014.01)
    *G06Q 30/02*      (2012.01)

(52) U.S. Cl.
    CPC ..... *G06Q 30/0234* (2013.01); *G06Q 30/0236* (2013.01); *G07F 17/32* (2013.01); *A63F 13/00* (2013.01)

(56) References Cited

U.S. PATENT DOCUMENTS

| | | | | |
|---|---|---|---|---|
| 2006/0020943 A1* | 1/2006 | Boutcher | ............ | G06F 9/5077 718/104 |
| 2007/0043616 A1* | 2/2007 | Kutaragi | ............... | A63F 13/77 705/14.68 |
| 2010/0121695 A1* | 5/2010 | Ward | .................. | G06Q 30/02 705/14.12 |
| 2010/0223115 A1 | 9/2010 | Chodosh et al. | | |
| 2012/0064969 A1* | 3/2012 | Uchibori | ............. | A63F 13/335 463/29 |
| 2014/0025535 A1* | 1/2014 | Douglas | ............ | G06Q 30/0633 705/26.8 |

OTHER PUBLICATIONS

International Search Report dated Oct. 8, 2013.
Huan Yu Chen: "<<DIABLO 3>> Test Activation Code Reservation System Being Released", "http://game.zol.com.cn/234/2348937.html" 1-2 pages, Jun. 16, 2011, with Partial English Translation.
Zuixiyou, "Sign up to closed test, get genuine gold ingots", "http://www.91wan.com/zxy/youxihuodong/2012-07/98840.html", 91 wan Zuixiyou, p. 1-2, Jul. 20, 2012, with Partial English Translation.

\* cited by examiner

SERVER DEVICE AND SERVER PROGRAM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/072985 filed on Aug. 28, 2013 and designating the U.S., which claims priority to Japanese Patent Application No. 2012-190454 filed on Aug. 30, 2012. The entire contents of the foregoing applications are incorporated herein by reference.

BACKGROUND OF THE INVENTION

1. Field of the Invention

The present invention relates to a technique for controlling a game on a terminal device via a network.

2. Description of the Related Art

Pre-registration of a game app (game application program) before its release is one example of a technique for promoting the use of a game app that is run on a terminal device.

The technique involves having a user pre-register for a game app before its release and giving the user a reward such as a predetermined item or a capability value when the user downloads and runs the game app after its release.

According to this technique, users may be motivated to pre-register because they will be able to use a predetermined item or a capability value from the start of the game and thereby have an advantage in playing the game, and by encouraging users to pre-register, the number of users that download and play the game may be increased.

Note that at the time of filing the present application, the inventors of the present invention were unable to find publicly disclosed prior art documents relating to the present invention. Accordingly, prior art document information is not provided herein.

Although pre-registration as described above is an effective technique for promoting use of a game app, some game app distribution environments artificially implement a policy of prohibiting game apps configured to have a user input a code or the like within the game app to unlock or add a new function or content.

In such distribution environments, it may not be possible to implement such a promotion measure using pre-registration.

SUMMARY OF THE INVENTION

An aspect of the present invention is directed to providing a technique for enabling implementation of a promotion measure using pre-registration even in a distribution environment that prohibits a user from inputting a code or the like within a game app.

According to one embodiment of the present invention, a server device is provided that includes a registration unit configured to accept information identifying a target application for pre-registration and information identifying a user from a terminal device and register the accepted information, and a providing unit configured to provide registration information to a management service for performing a verification with respect to the information identifying the target application and the information identifying the user accepted from the terminal device after the target application is released. The registration information may be provided in a batch or each time the verification is performed.

DESCRIPTION OF THE PREFERRED EMBODIMENTS

In the following, embodiments of the present invention are described with reference to the accompanying drawings.

<Configuration>

Figure 1:
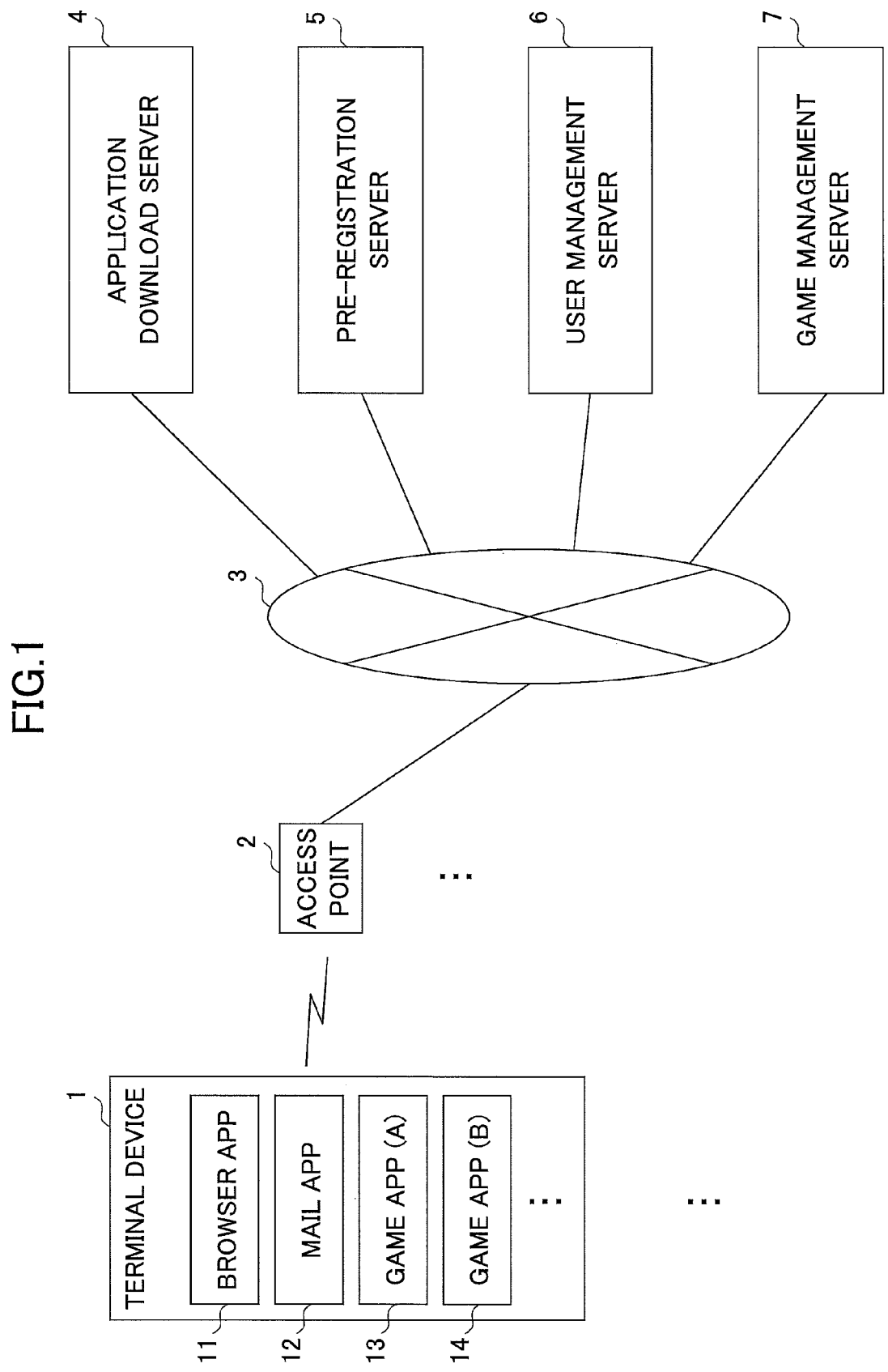
FIG. 1 illustrates an exemplary configuration of a system according to an embodiment of the present invention.

FIG. 1 illustrates an exemplary configuration of a system according to an embodiment of the present invention.

In FIG. 1, the system includes a terminal device 1 such as a smart phone or a mobile phone owned by a user (player), an access point 2 such as a mobile radio base station or a Wi-Fi station, a network 3 such as the Internet; and various types of servers 4-7.

The terminal device 1 includes a browser app 11, a mail app 12, a game app (A) 13, and a game app (B) 14.

The browser app 11 is configured to perform operations such as transmitting form data and requesting/acquiring/displaying page data described in a language such as HTML (Hyper Text Markup Language) in accordance with a standard protocol of the Internet such as HTTP (Hyper Text Transfer Protocol).

The mail app 12 is configured to transmit/receive email messages according to a protocol such as POP (Post Office Protocol), IMAP (Internet Message Access Protocol), or HTTP, for example. The mail app 12 also includes a browser function and is configured to operate as a browser. Note that although the mail app 12 is actually configured to access a mail server, a description of the mail server is omitted below, and it is assumed that an email is transmitted directly from a sender to the mail app 12.

The game apps 13 and 14 are configured to run predetermined games. The game apps 13 and 14 also include browser functions for operating as browsers. Note that in the following descriptions, it is assumed that the game app 14 corresponds to a target application for a pre-registration campaign, and because the game app 14 is still in the pre-registration stage and is not yet released, the game app 14 is not downloaded and installed in the terminal device 1.

An application download server 4 has applications such as the game apps 13 and 14 stored therein and is configured to download and install the applications in the terminal device 1.

A pre-registration server 5 is configured to accept a pre-registration via a pre-registration page and manage information identifying a user that has pre-registered (e.g., user ID, email address, campaign code) in association with an app ID of the target application and a corresponding reward.

A user management server 6 provides a management service (user management service) for managing a plurality of applications such as game apps and game magazine apps. The user management server 6 is configured to manage a user ID identifying a user and a terminal ID identifying a terminal device in association with each other. An application corresponding to a service provided by the user management server 6 internally stores a user ID managed by the user management server 6 and transmits the user ID as is necessary when the user management server 6 is accessed.

A game management server 7 is configured to manage login and operation statuses of the game apps 13 and 14, for example. Also, with respect to the game app 14 corresponding to a pre-registration target, the game management server 7 is configured to manage operations such as granting a reward, for example. Note that in some embodiments, the game management server 7 may be separately provided for the game app 13 and the game app 14, for example. Also, in a case where the pre-registration server 5, the user management server 6, and the game management server 7 are run by the same operation entity, the pre-registration server 5, the user management server 6, and the game management server 7 may be arranged in the same server device, for example.

Figure 2:
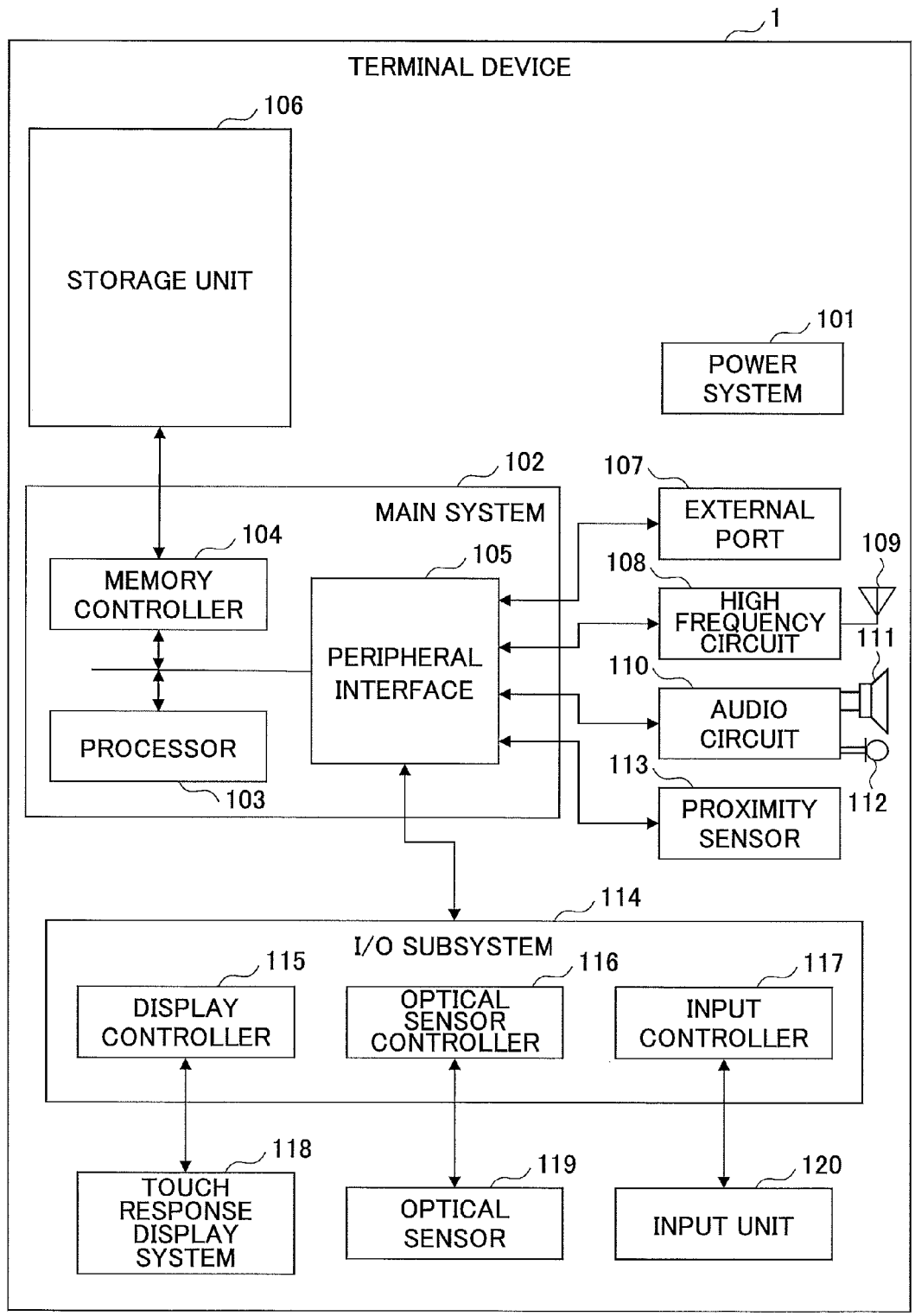
FIG. 2 illustrates an exemplary hardware configuration of a terminal device according to an embodiment of the present invention.

FIG. 2 illustrates an exemplary hardware configuration of the terminal device 1.

In FIG. 2, the terminal device 1 includes a power system 101; a main system 102 including a processor 103, a memory controller 104, and a peripheral interface 105; a storage unit 106; an external port 107; a high frequency circuit 108; an antenna 109; an audio circuit 110; a speaker 111; a microphone 112; a proximity sensor 113; an I/O subsystem 114 including a display controller 115, an optical sensor controller 116, and an input controller 117; a touch response display system 118; an optical sensor 119; and an input unit 120.

Figure 3:
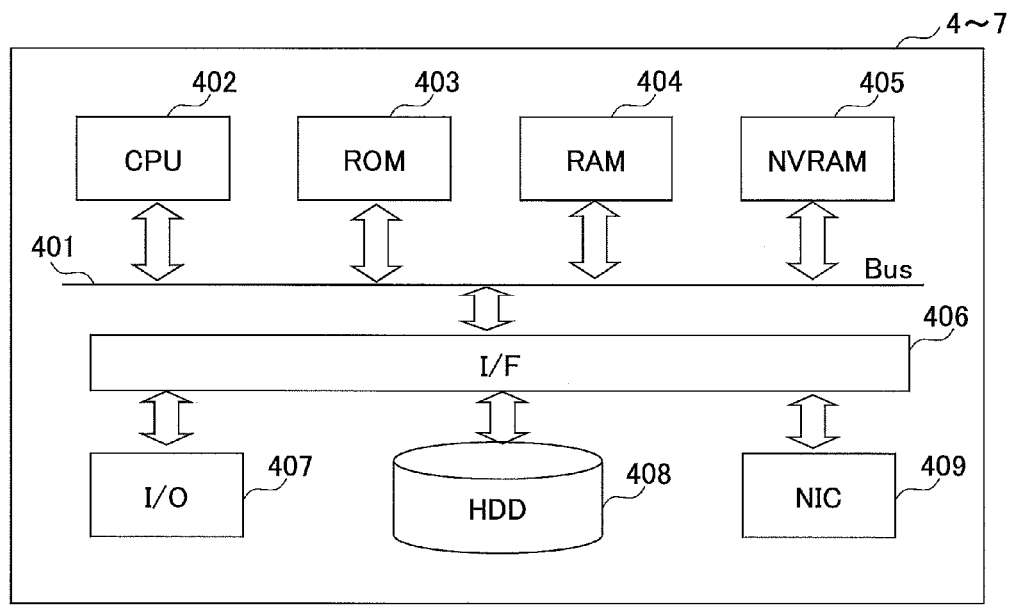
FIG. 3 illustrates an exemplary hardware configuration of a server according to an embodiment of the present invention.

FIG. 3 illustrates an exemplary hardware configuration of the servers 4-7.

In FIG. 3, the servers 4-7 include a CPU (Central Processing Unit) 402, a ROM (Read-Only Memory) 403, a RAM (Random Access Memory) 404, an NVRAM (Non-Volatile Random Access Memory) 405, and an I/F (Interface) 406 that are connected to a system bus 401. Also, the servers 4-7 include I/O devices 407 such as a keyboard, a mouse, a monitor, and/or a CD/DVD (Compact Disk/Digital Versatile Disk) drive; a HDD (Hard Disk Drive) 408; and an NIC (Network Interface Card) 409 that are connected to the I/F 406.

<Operation: First Process Pattern>

Figure 4:
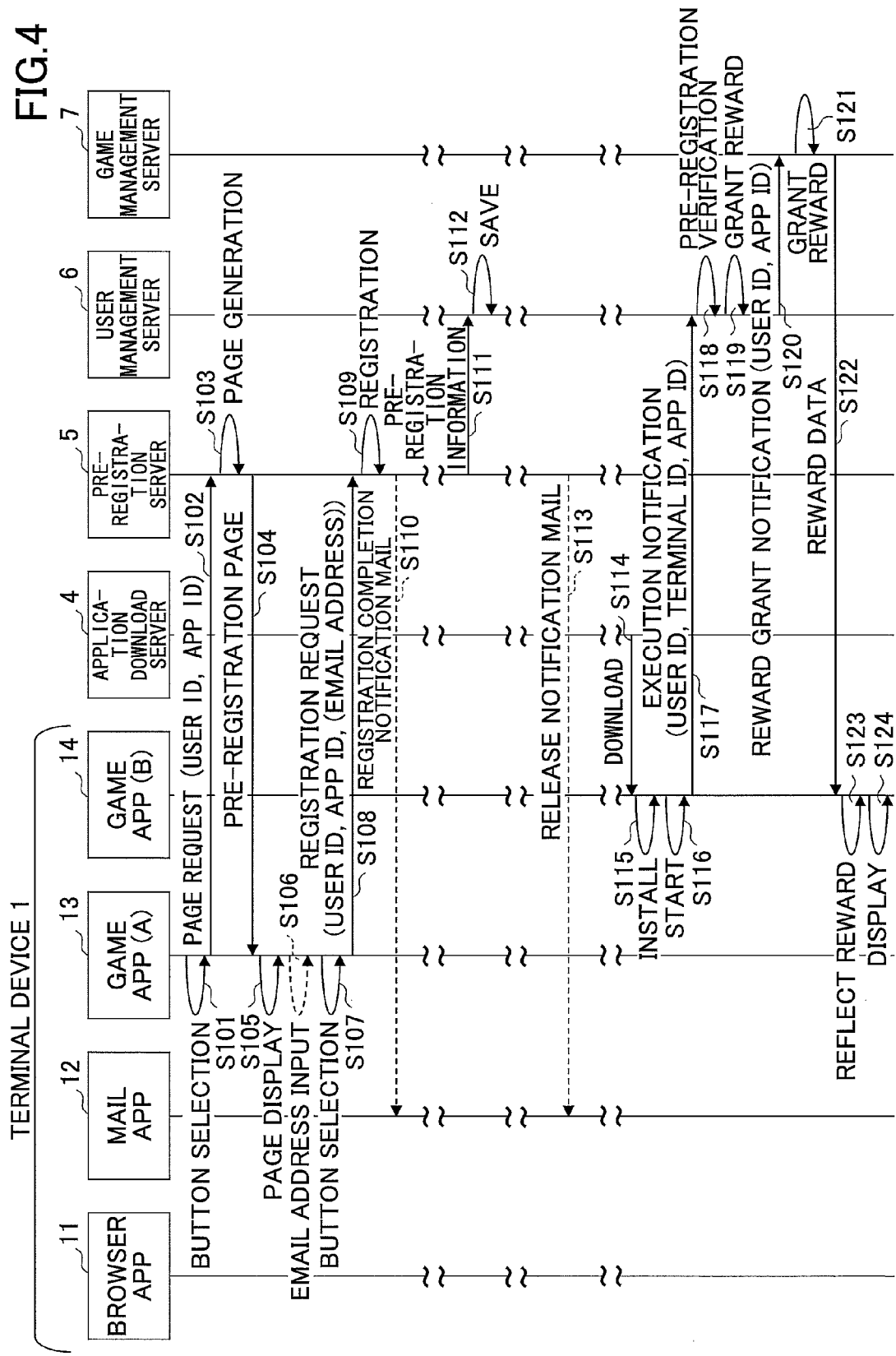
FIG. 4 is a sequence chart illustrating exemplary process steps of a first process pattern according to an embodiment of the present invention.

FIG. 4 is a sequence chart illustrating exemplary process steps of a first process pattern according to an embodiment of the present invention. In the first process pattern, which involves the game apps 13 and 14 that are associated with a user ID managed by the user management server 6, pre-registration for the game app 14 that is scheduled to be released is performed from the game app 13, and a reward is acquired within the game app 14 after its release.

Note that the game app 13 for starting pre-registration is not limited to a game app per se, but may be other types of applications such as a game magazine app that is associated with the user ID managed by the user management server 6, for example.

In FIG. 4, when a user of the terminal device 1 selects a button such as a registration button from a screen provided by the game app 13 encouraging the user to pre-register for the game app 14 (step S101), the game app 13 uses its browser function to send a page request to the pre-registration server 5 based on a URL of the pre-registration server 5 that is set up for the button, an app ID of the game app 14 corresponding to the pre-registration target (campaign target), and the user ID managed by the user management server 6 that is internally stored in the game app 13 (step S102). The page request includes the user ID and the app ID. Note that in some embodiments where a URL for accessing the pre-registration server 5 is set up for each game app corresponding to the pre-registration target and a correlation between the URL and the app ID is managed at the pre-registration server 5 side, the app ID does not have to be included in the page request.

Figure 5:
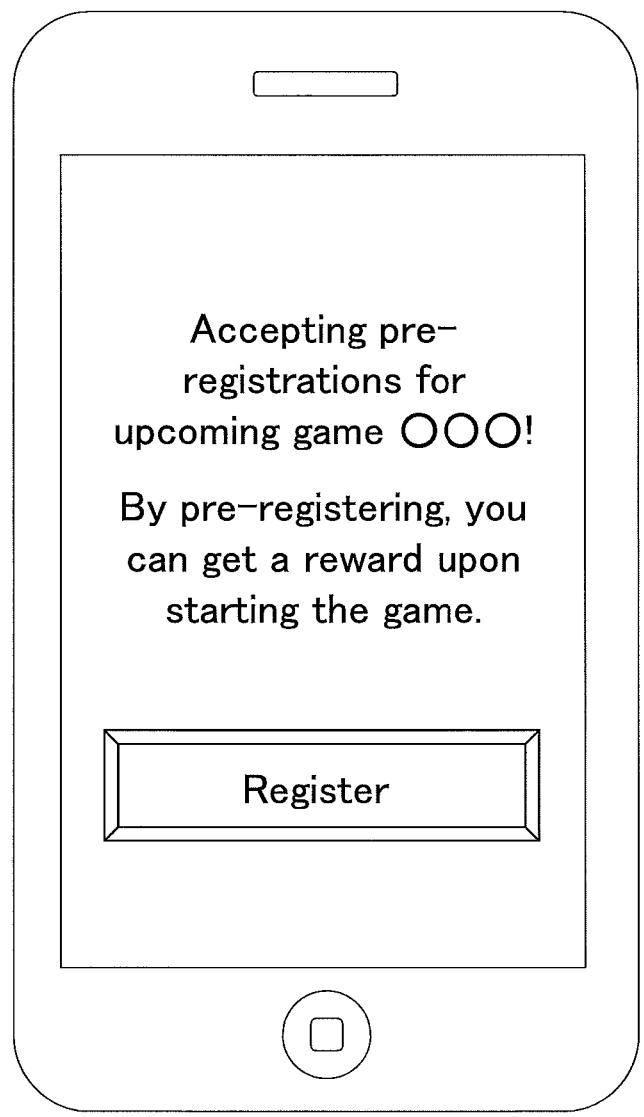
FIG. 5 illustrates an exemplary screen for encouraging pre-registration.

FIG. 5 illustrates an exemplary screen provided by the game app 13 encouraging pre-registration for a game to be released. The screen illustrated in FIG. 5 displays an announcement stating "Accepting pre-registrations for upcoming game ◯◯◯! By pre-registering, you can get a reward upon starting the game," and a "Register" button.

Note that the screen provided by the game app 13 encouraging pre-registration may be displayed when a "News" section of a menu is selected or when a predetermined icon within the game is selected, for example. Further, a screen encouraging pre-registration is not limited to being a screen prepared within the game app 13. For example, a page of a server providing information on new games may be displayed when a predetermined icon within a game is selected, and a screen encouraging pre-registration (screen provided by the server) may be displayed when a desired game is selected from the page.

Referring back to FIG. 4, upon receiving the page request from the game app 13 of the terminal device 1, the pre-registration server 5 generates a pre-registration page according to predetermined design information (step S103), and returns the generated page data to the game app 13 of the terminal device 1 (step S104). In turn, the game app 13 of the terminal device 1 displays the pre-registration page (step S105).

Figure 6:
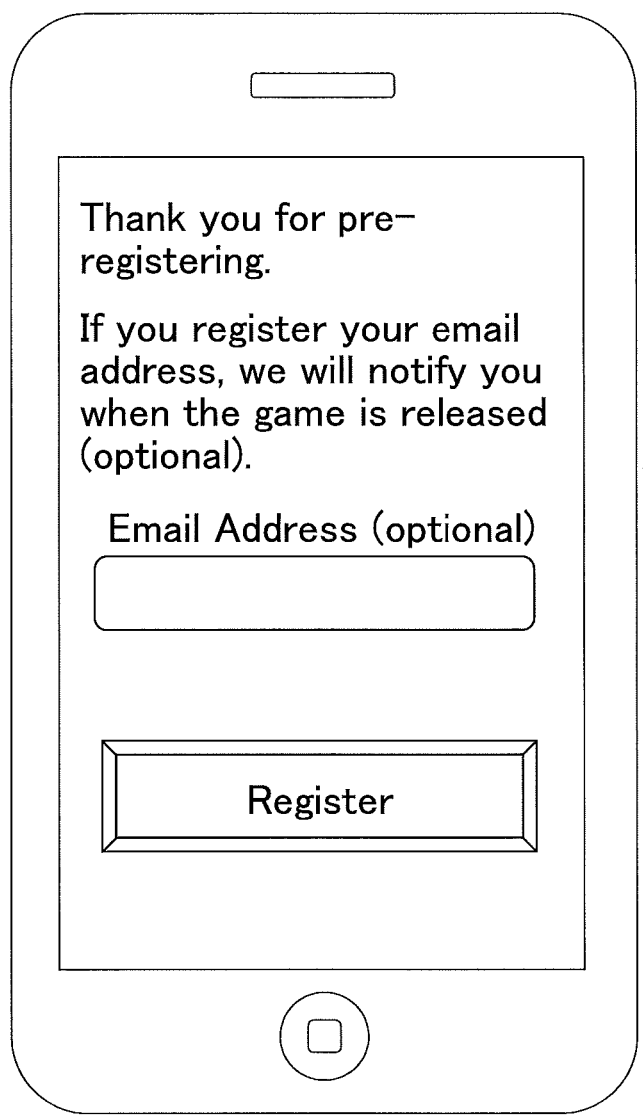
FIG. 6 illustrates an exemplary screen displaying a pre-registration page.

FIG. 6 illustrates an exemplary screen displaying a pre-registration page. The screen illustrated in FIG. 6 displays an announcement stating "Thank you for pre-registering. If you register your email address, we will notify you when the game is released (optional)," an email address input field, and a "Register" button.

Referring back to FIG. 4, if desired, the user of the terminal device 1 may input his/her email address (step S106), and select a button such as a registration button (step S107). In turn, the game app 13 uses its browser function to send a registration request including the user ID, the app ID, and the registered email address (if input) to the pre-registration server 5 (step S108).

Upon receiving the registration request from the game app 13 of the terminal device 1, the pre-registration server 5 registers the user ID, the email address, the app ID, and a corresponding reward in association with each other (step S109). Note that a corresponding reward such as granting a certain number of points or a certain item may be set up with respect to each game app that is identified by an app ID.

Then, after pre-registration is completed, and if an email address is registered, the pre-registration server 5 sends a pre-registration completion notification mail to the terminal device 1 (step S110).

Figure 7:
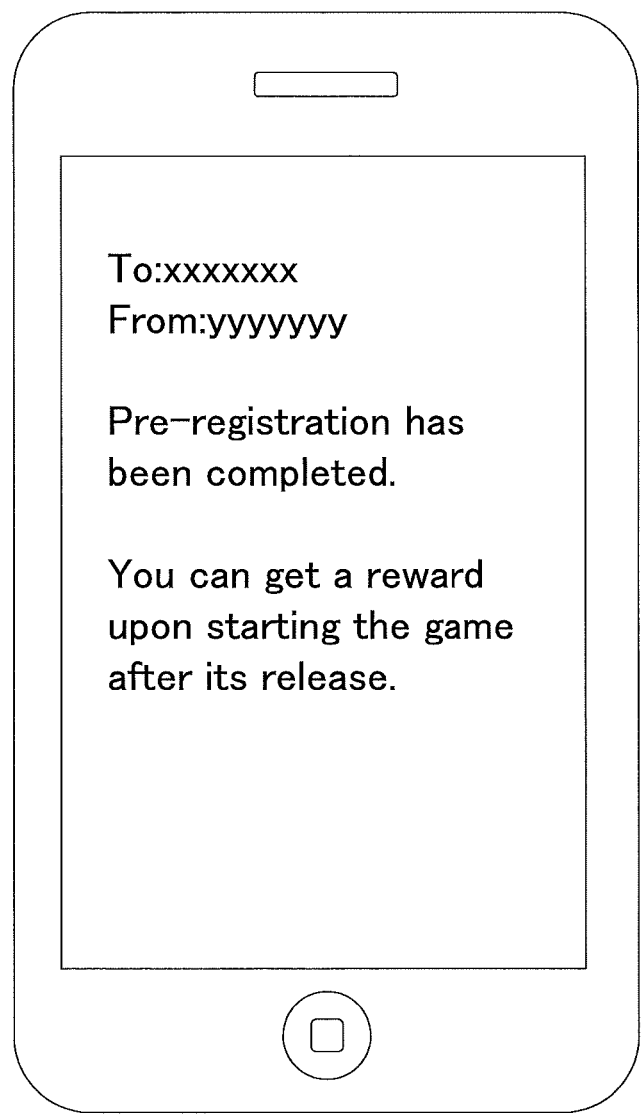
FIG. 7 illustrates an exemplary screen displaying a pre-registration completion notification mail.

FIG. 7 illustrates an exemplary screen displaying a pre-reregistration completion notification mail. The screen illustrated in FIG. 7 displays a destination "To", a sender "From", and an announcement stating "Pre-registration has been completed. You can get a reward upon starting the game after its release."

Note that the pre-registration completion notification may also be provided as a web page that is returned to the game app 13 of the terminal device 1, for example. However, notification by email may be more advantageous in terms of reminding the user that he/she has pre-registered for the game because email leaves a record.

Referring back to FIG. 4, when the term for accepting pre-registrations ends, the pre-registration server 5 extracts pre-registration information including at least the user ID and the reward associated with each app ID from the registered information and provides the extracted pre-registration information to the user management server 6 (step S111). The pre-registration information is then stored at the user management server 6 (step S112). Note that the pre-registration information may be provided to the user management server 6 online or offline in a suitable data format such as the CSV (Comma Separated Values) data format. Note that in a case where the user management server 6 is configured to query the pre-registration server 5 regarding pre-registration information each time it performs pre-registration verification in a subsequent step, the step of providing pre-registration information in a batch from the pre-registration server 5 to the user management server 6 may be omitted.

Then, right before the game app 14 corresponding to the pre-registration target is released, the pre-registration server 5 sends a release notification mail to the terminal device 1 if an email address is registered (step S113).

Figure 8:
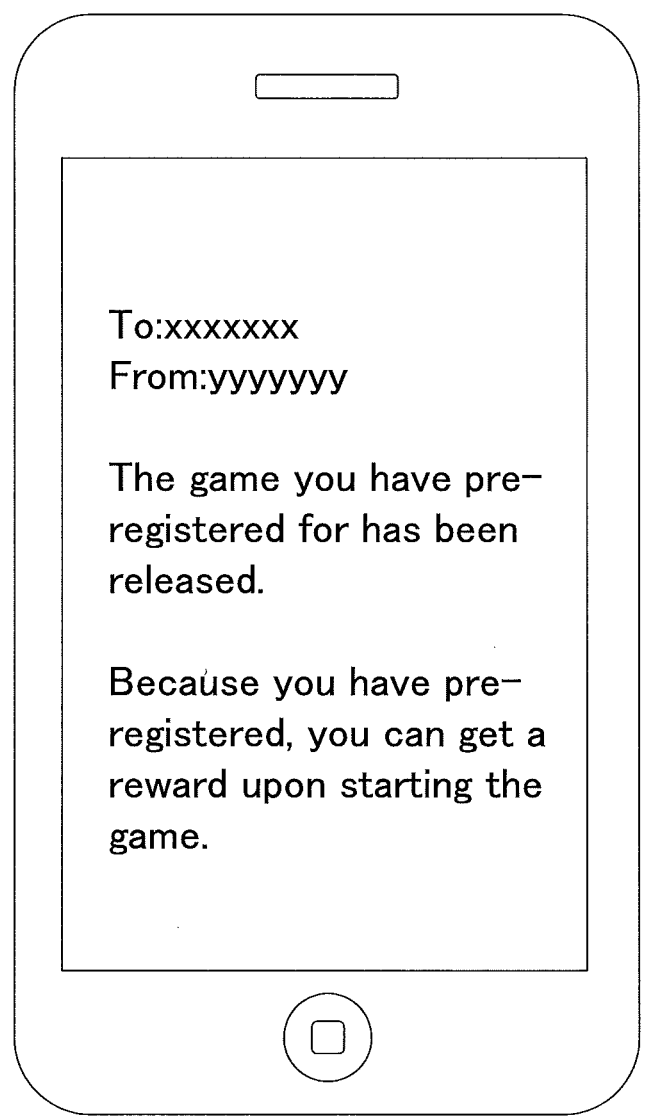
FIG. 8 illustrates an exemplary screen displaying a release notification mail.

FIG. 8 illustrates an exemplary screen displaying a release notification mail. The screen illustrated in FIG. 8 displays a destination "To", a sender "From", and an announcement stating "The game you have pre-registered for has been released. Because you have pre-registered, you can get a reward upon starting the game."

Referring back to FIG. 4, after the game app 14 is released, the user of the terminal device 1 downloads the game app 14 from the application download server 4 (step S114), and installs the game app 14 (step S115).

Then, when the game app 14 is started (step S116), the game app 14 sends an execution notification including the user ID, the terminal ID, and the app ID to the user management server 6 based on a URL of the user management server 6 that is set up within the game app 14 (step S117).

Upon receiving the execution notification from the game app 14 of the terminal device 1, the user management server 6 determines whether the user ID and the terminal ID included in the execution notification are consistent with the information managed by the user management server 6, and further performs a verification to determine whether the execution notification includes the user ID corresponding to the pre-registration information obtained from the pre-registration server 5 (step S118).

Then, if the verification is successfully performed, the user management server 6 grants a corresponding reward associated with the user ID to the game app 14 of the terminal device 1 (step S119). Note that the granting of the reward in the above step may include updating management information relating to the game app with the relevant app ID associated with the relevant user ID, for example.

Then, the user management server 6 sends a reward grant notification including the user ID and the app ID to the game management server 7 (step S120). Note that in a case where the game management server 7 is a dedicated server for the game app 14, the app ID does not have to be included in the reward grant notification.

Then, the game management server 7 grants the corresponding reward to the game app 14 of the terminal device 1 (step S121). Note that the granting of the reward in the above step may include generating and acquiring reward data used to reflect the reward at the terminal device 1 side, and updating a record of the reward granted in a case where a record is kept as user history, for example.

Then, the game management server 7 transmits the reward data to the game app 14 of the terminal device 1 (step S122), and in turn, the game app 14 reflects the reward based on the received reward data (step S123). For example, the game app 14 may add points, add an item, or increase a capacity value by updating game management information.

When the reward is reflected, the game app 14 of the terminal device 1 displays information indicating that the reward has been reflected (step S124).

Figure 9:
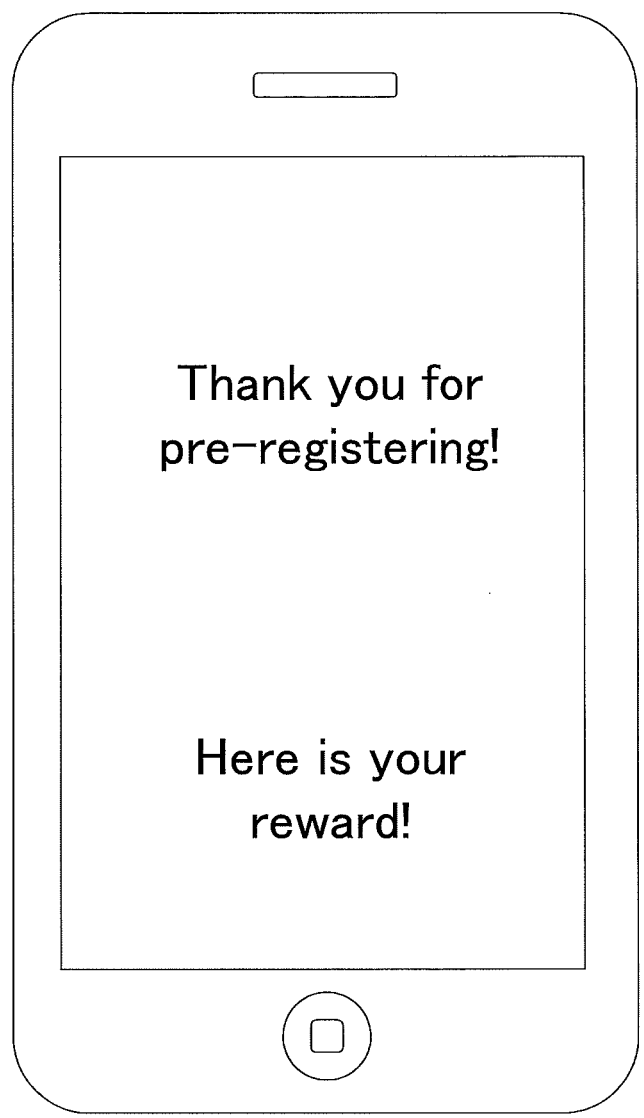
FIG. 9 illustrates an exemplary screen displayed upon reward acquisition.

FIG. 9 illustrates an exemplary screen that may be displayed when a reward is acquired. The screen illustrated in FIG. 9 displays a message stating "Thank you for pre-registering! Here is your reward!"

<Operation: Second Process Pattern>

Figure 10:
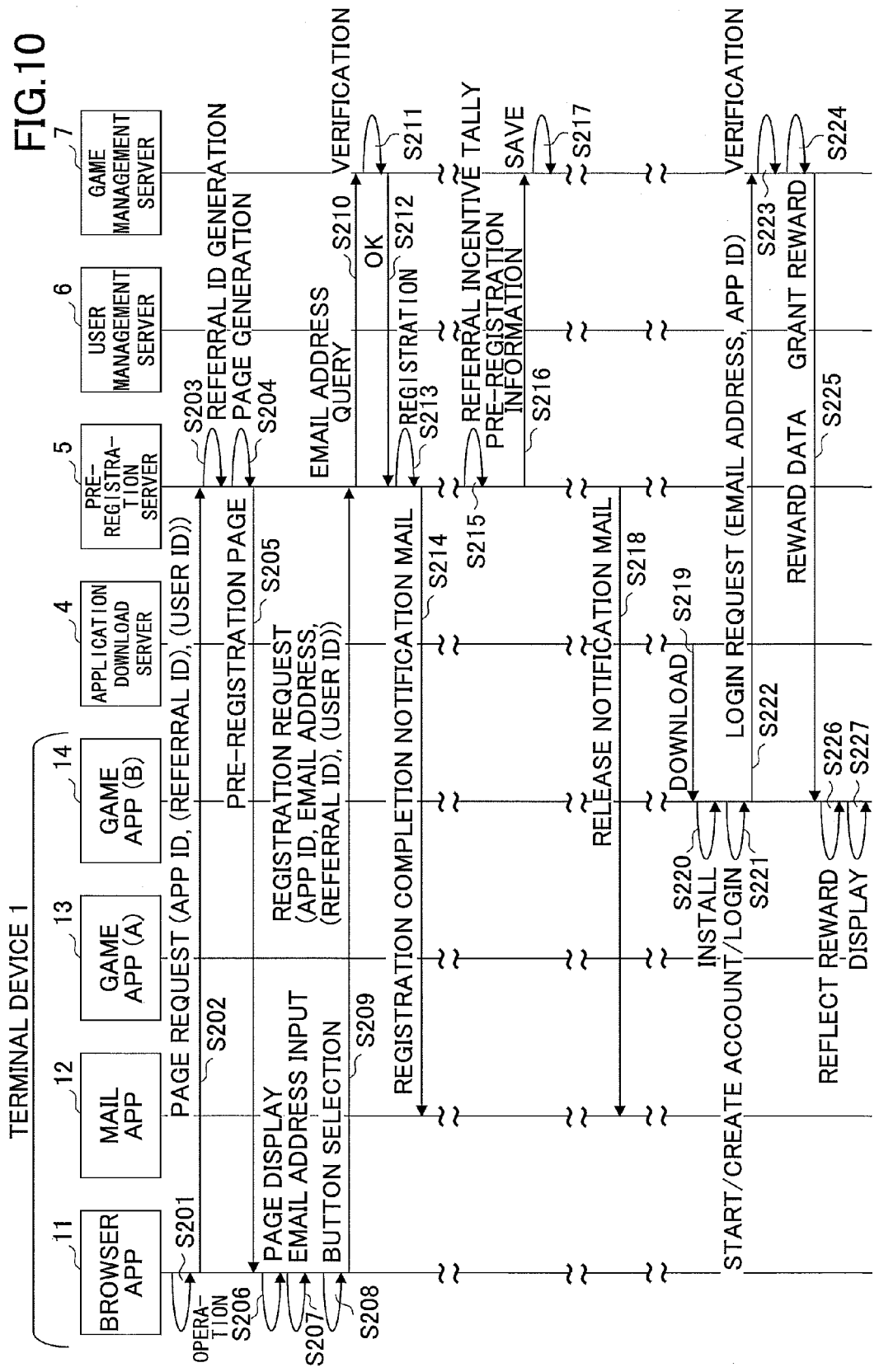
FIG. 10 is a sequence chart illustrating exemplary process steps of a second process pattern according to an embodiment of the present invention.

FIG. 10 is a sequence chart illustrating exemplary process steps of a second process pattern according to an embodiment of the present invention. In the second process pattern, which involves the game app 14 that is configured to enable login using an email address, pre-registration for the game app 14 that is scheduled to be released is performed from a given browser, and a reward is acquired within the game app 14 after its release.

In the following, a case where the browser app 11 accesses the pre-registration server 5 is described as an illustrative example. However, in other examples, the pre-registration server 5 may be accessed by the browser function of the mail app 12 via a URL including a referral ID that is received by the mail app 12, or the pre-registration server 5 may be accessed by the browser function of the game app 13. Also, the pre-registration server 5 may be accessed by a device such as a PC that is different from the terminal device 1, for example.

In FIG. 10, when the user of the terminal device 1 selects a button such as a GO button displayed by the browser app 11 for prompting a transition to a pre-registration screen for the game app 14 (step S201), the browser app 11 sends a page request to the pre-registration server 5 based on a URL of the pre-registration server 5 that is set up for the button and the app ID of the game app 14 corresponding to the pre-registration target (campaign target) (step S202). Note that the page request includes the app ID. In the case where the pre-registration server 5 is accessed by the browser function of the mail app 12 via a URL including a referral ID, the page request may include the referral ID. Also, in the case where the pre-registration server 5 is accessed by the game app 13 that is managed in association with the user ID of the user by the user management server 6, the page request may include the user ID, for example.

Note that in a case where a URL for accessing the pre-registration server 5 is provided for each pre-registration target game app and the correlation between the URL and the app ID is managed at the pre-registration server 5 side, the app ID may be omitted from the page request.

Figure 11:
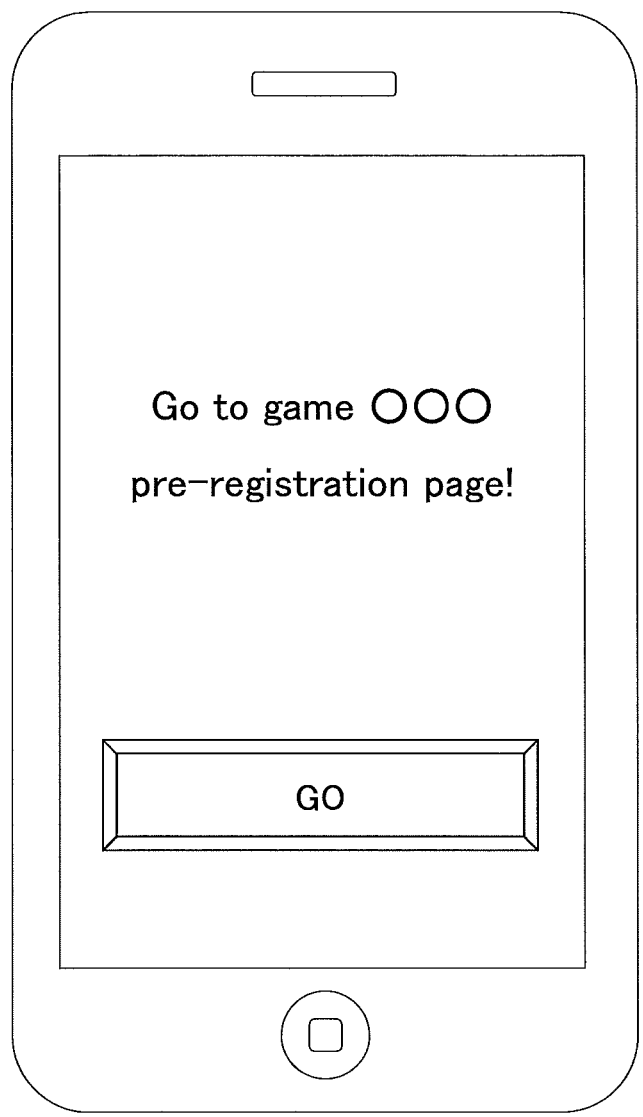
FIG. 11 illustrates an exemplary screen encouraging transition to a pre-registration screen.

FIG. 11 illustrates an exemplary screen for encouraging the user to transition to a pre-registration screen. The screen illustrated in FIG. 11 includes an announcement stating "Go to game ○○○ pre-registration page!" and a "GO" button.

Referring back to FIG. 10, upon receiving the page request from the browser app 11 of the terminal device 1, the pre-registration server 5 generates a referral ID to be distributed (step S203). Note that in a case where a referral ID is included in the page request, the existing referral ID may be used instead of generating a new referral ID, for example.

Then, the pre-registration server 5 generates a pre-registration page based on predetermined design information (step S204), and returns page data of the pre-registration page to the browser app 11 of the terminal device 1 (step S205). In turn, the browser app 11 of the terminal device 1 displays the pre-registration page (step S206).

Figure 12:
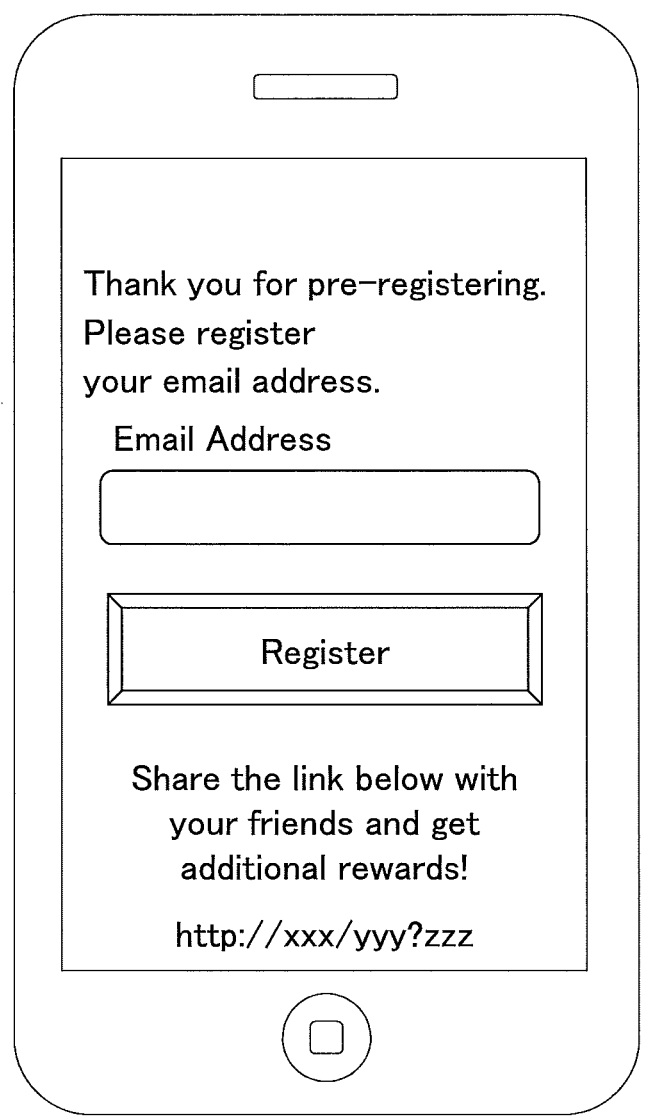
FIG. 12 illustrates an exemplary screen displaying a pre-registration page.

FIG. 12 illustrates an exemplary screen displaying a pre-registration page. The screen illustrated in FIG. 12 displays an announcement stating "Thank you for pre-registering. Please register your email address," an email address input field, a "Register" button, and another announcement stating "Share the link below with your friends and get additional rewards! http://xxx/yyy?zzz." The URL to be referenced includes the URL for accessing the pre-registration server 5 and the referral ID.

Referring back to FIG. 10, when the user of the terminal device 1 inputs his/her email address (step S207) and selects a button such as a registration button (step S208), the browser app 11 sends a registration request to the pre-registration server 5 (step S209). The registration request includes the app ID, the email address, the referral ID (if available), and the user ID (if available).

Upon receiving the registration request from the browser app 11 of the terminal device 1, the pre-registration server 5 performs a verification to determine whether the email address included in the registration request is registered in the game management server 7 (steps S210-S212). Note that in a case where the email address is most likely not registered in the game management server 7, the verification of the email address may be omitted.

Then, in the case where the verification of the email address reveals that the email address is properly registered (or without the verification if the verification step is omitted), the pre-registration server 5 registers the app ID, the email address, the referral ID (if available), and the user ID (if available) in association with each other (step S213). Note that a corresponding reward such as granting a certain number of points or a certain item may be set up for each game app identified by an app ID.

Then, after pre-registration is completed, the pre-registration server 5 transmits a pre-registration completion notification mail to the terminal device 1 (step S214).

Figure 13:
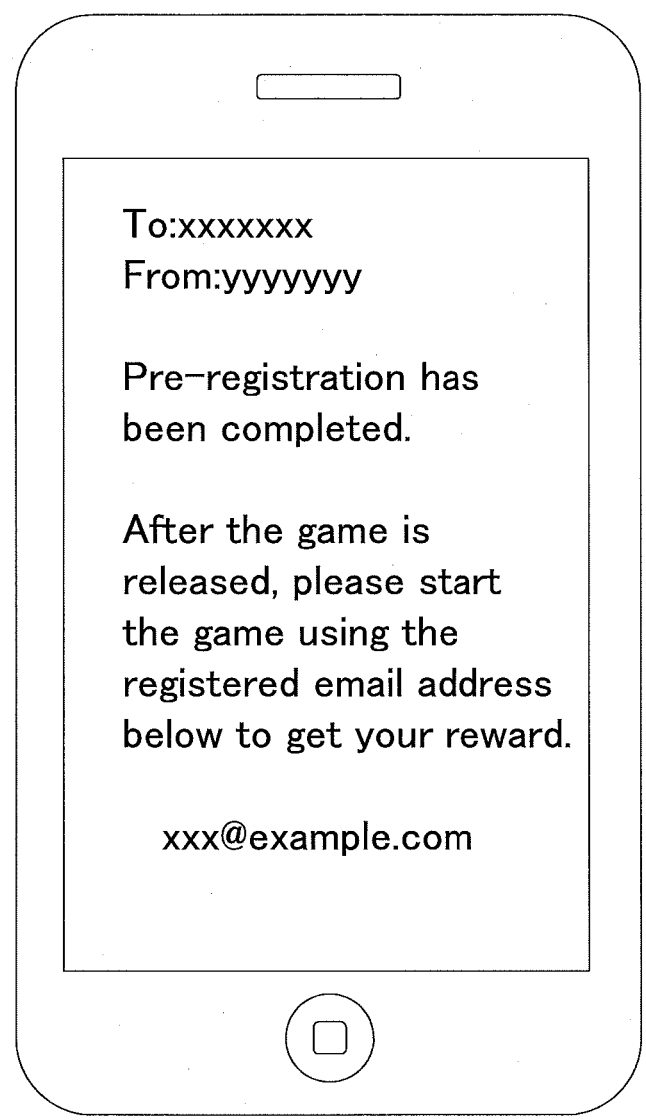
FIG. 13 illustrates an exemplary screen displaying a pre-registration completion notification mail.

FIG. 13 illustrates an exemplary screen displaying a pre-registration completion notification mail. The screen illustrated in FIG. 13 displays a destination "To", a sender "From", and an announcement stating "Pre-registration has been completed. After the game is released, please start the game using the registered email address below to get your reward. xxx@example.com."

Note that the pre-registration completion notification may also be provided as a web page to be displayed at the terminal device 1 that is returned to the browser app 11 of the terminal device 1, for example. However, notification by email may be more advantageous in terms of reminding the user that he/she has pre-registered for the game app 14 because email leaves a record.

Referring back to FIG. 10, when the term for accepting pre-registrations ends, the pre-registration server 5 tallies referral incentives based on the registered information (step S215). That is, the pre-registration server 5 tallies the referral IDs and determines the number of people that have pre-registered in response to referrals using the email address identifying the user that has contributed to distributing the referral IDs.

Then, the pre-registration server 5 extracts pre-registration information including at least the email address and the reward associated with each app ID from the registered information and provides the extracted information to the game management server 7 (step S216). The pre-registration information is then stored at the game management server 7 (step S217). Note that the pre-registration information may be provided to the game management server 7 online or offline in a suitable data format such as the CSV (Comma Separated Values) data format. Note that in a case where the game management server 7 is configured to query the pre-registration server 5 regarding pre-registration information each time it performs a pre-registration verification in a subsequent step, the step of providing pre-registration information in a batch from the pre-registration server 5 to the game management server 7 may be omitted.

Then, right before the game app 14 corresponding to the pre-registration target is released, the pre-registration server 5 sends a release notification mail to the terminal device 1 based on the registered email address (step S218).

Figure 14:
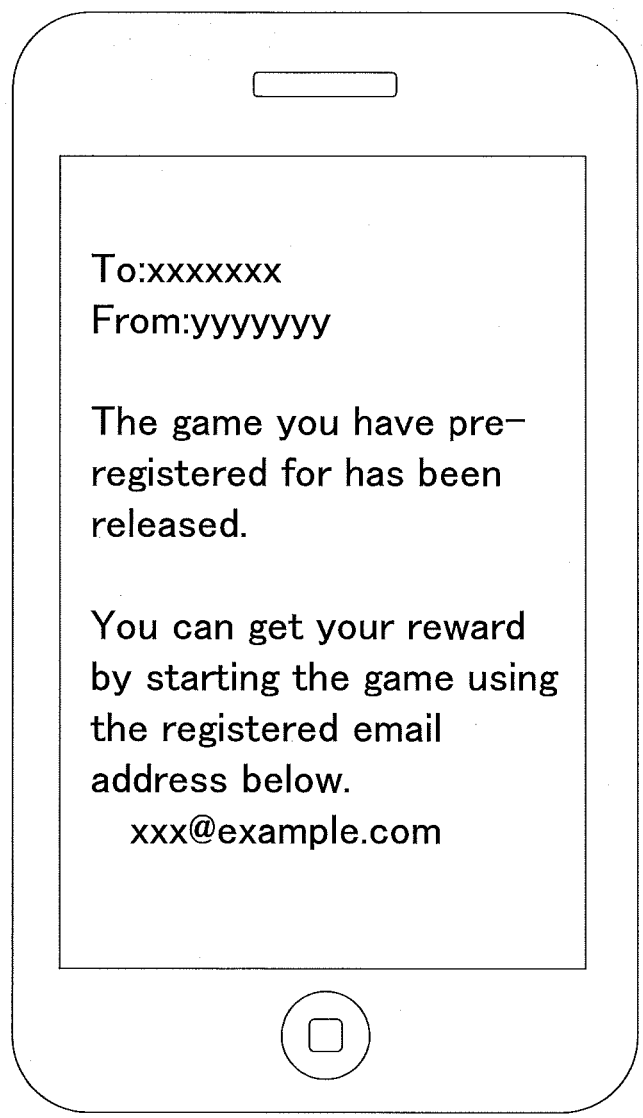
FIG. 14 illustrates an exemplary screen displaying a release notification mail.

FIG. 14 illustrates an exemplary screen displaying a release notification mail. The screen illustrated in FIG. 14 displays a destination "To", a sender "From", and an announcement stating "The game you have pre-registered for has been released. You can get your reward by starting the game using the registered email address below. xxx@example.com."

Referring back to FIG. 10, after the game app 14 is released, the user of the terminal device 1 downloads the game app from the application download server 4 (step S219), and installs the game app 14 (step S220).

Then, when the user starts the game app 14, creates an account, and logs into the game app 14 (step S221), the game app 14 sends a login request including the email address and the app ID to the game management server 7 based on a URL set up within the game app 14 (step S222). Note that in a case where the game management server 7 is a dedicated server for the game app 14, the app ID may be omitted from the login request.

Upon receiving the login request from the game app 14, the game management server 7 performs a verification to determine whether the email address included in the login request is included in the pre-registration information acquired from the pre-registration server 5 (step S223).

Then, if the verification is successful, the game management server 7 grants the corresponding reward associated with the email address to the game app 14 of the terminal device 1 (step S224). Note that the granting of the reward in the above step may include generating and acquiring reward data used to reflect the reward at the terminal device 1 side, and updating a record of the reward granted in a case where a record is kept as user history, for example. Also, in a case where there is a referral incentive reward in addition to a pre-registration reward, the granting of the reward may include granting the referral incentive reward as well.

Then, the game management server 7 transmits the reward data to the game app 14 of the terminal device 1 (step S225), and in turn, the game app 14 reflects the reward based on the received reward data (step S226). For example, the game management server 7 may add points, add an item, or increase a capacity value by updating game management information.

When the reward is reflected, the game app 14 of the terminal device 1 displays information indicating that the reward has been reflected (step S227). The indication that the reward has been reflected may be substantially identical to the example illustrated in FIG. 9.

<Operation: Third Process Pattern>

Figure 15:
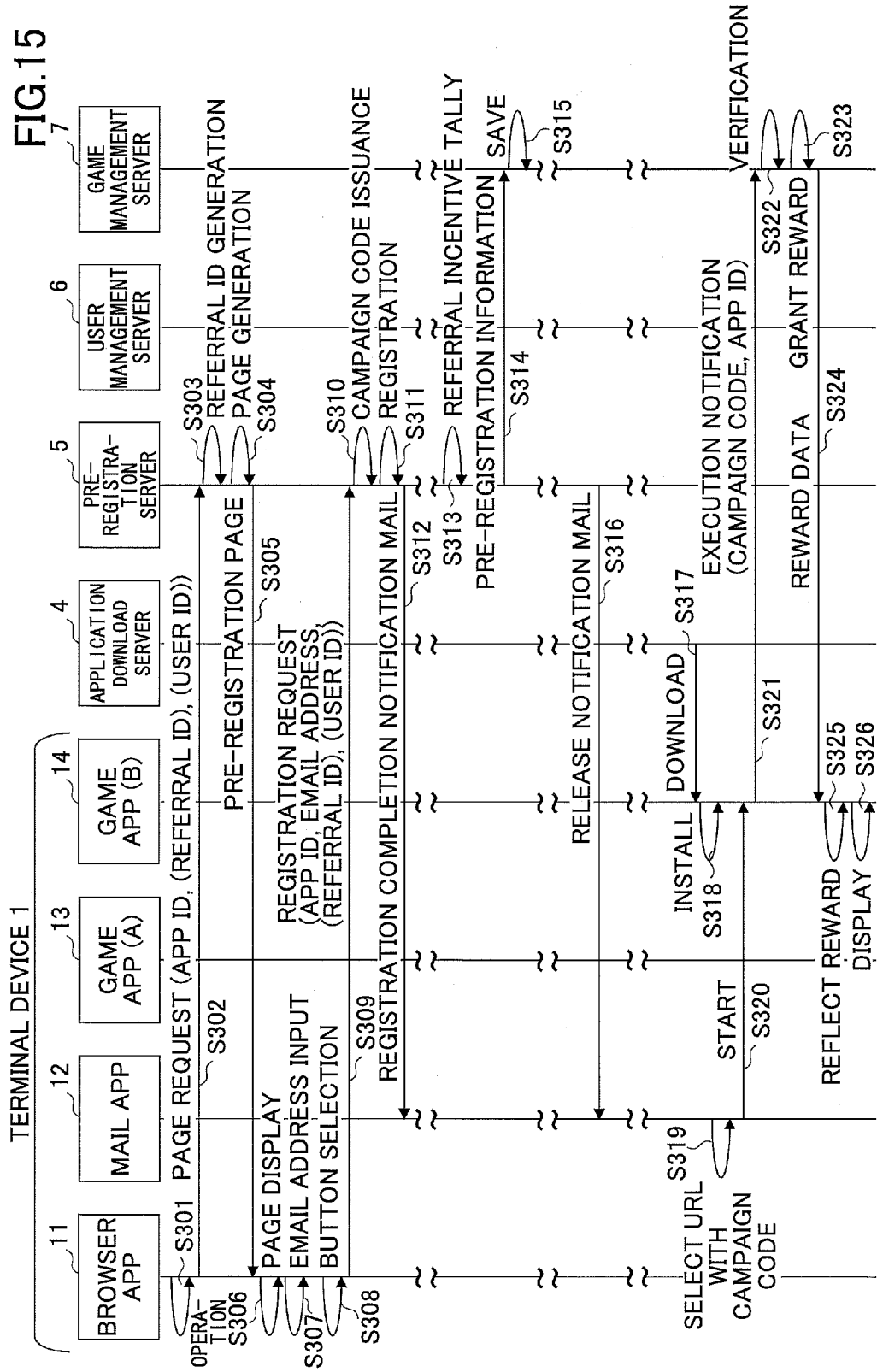
FIG. 15 is a sequence chart illustrating exemplary process steps of a third process pattern according to an embodiment of the present invention.

FIG. 15 is a sequence chart illustrating exemplary process steps of a third process pattern according to an embodiment of the present invention. The third process pattern involves issuing a unique campaign code when pre-registration is performed using an email address, transmitting to the user an email that is embedded with a link describing a URL scheme and the like for passing the campaign code as a parameter and starting the game app 14, and after the game app 14 is released, starting the game app 14 using the link embedded in the email and accessing the game management server 7 to acquire a corresponding reward.

In the following, a case where the browser app 11 accesses the pre-registration server 5 is described as an illustrative example. However, in other examples, the pre-registration server 5 may be accessed by the browser function of the mail app 12 via a URL including a referral ID that is received by the mail app 12, or the pre-registration server 5 may be accessed by the browser function of the game app 13. Also, the pre-registration server 5 may be accessed by a device such as a PC that is different from the terminal device 1, for example.

In FIG. 15, when the user of the terminal device 1 selects a button such as a GO button displayed by the browser app 11 for prompting a transition to a pre-registration screen for the game app 14 (step S301), the browser app 11 sends a page request to the pre-registration server 5 based on a URL of the pre-registration server 5 that is set up for the button and the app ID of the game app 14 corresponding to the pre-registration target (campaign target) (step S302). Note that the page request includes the app ID. In the case where the pre-registration server 5 is accessed by the browser function of the mail app 12 via a URL including a referral ID, the page request may include the referral ID. Also, in the case where the pre-registration server 5 is accessed by the game app 13 that is managed in association with the user ID of the user by the user management server 6, the page request may include the user ID, for example.

Note that in a case where a URL for accessing the pre-registration server 5 is provided for each pre-registration target game app and the correlation between the URL and the app ID is managed at the pre-registration server 5 side, the app ID may be omitted from the page request.

Note that a screen for encouraging the user to transition to a pre-registration screen in the present example may be identical to that illustrated in FIG. 11.

Referring back to FIG. 15, upon receiving the page request from the browser app 11 of the terminal device 1, the pre-registration server 5 generates a referral ID to be distributed (step S303). Note that in a case where a referral ID is included in the page request, the existing referral ID may be used instead of generating a new referral ID, for example.

Then, the pre-registration server 5 generates a pre-registration page based on predetermined design information (step S304), and returns page data of the pre-registration page to the browser app 11 of the terminal device 1 (step S305). In turn, the browser app 11 of the terminal device 1 displays the pre-registration page (step S306). Note that the pre-registration page of the present example may be identical to that illustrated in FIG. 12.

Referring back to FIG. 15, when the user of the terminal device 1 inputs his/her email address (step S307) and selects a button such as a registration button (step S308), the browser app 11 sends a registration request to the pre-registration server 5 (step S309). The registration request includes the app ID, the email address, the referral ID (if available), and the user ID (if available).

Upon receiving the registration request from the browser app 11 of the terminal device 1, the pre-registration server 5 issues a unique campaign code (step S310), and registers the app ID, the email address, the campaign code, the referral ID (if available), and the user ID (if available) in association with each other (step S311). A corresponding reward such as granting a certain number of points or a certain item may be set up in association with each game app identified by an app ID.

Then, after pre-registration is completed, the pre-registration server 5 transmits a pre-registration completion notification mail to the terminal device 1 (step S312). The pre-registration completion notification mail has a link embedded therein that describes a URL scheme and the like for starting the game app 14 when it is selected and passing the campaign code as a parameter to the game app 14.

Figure 16:
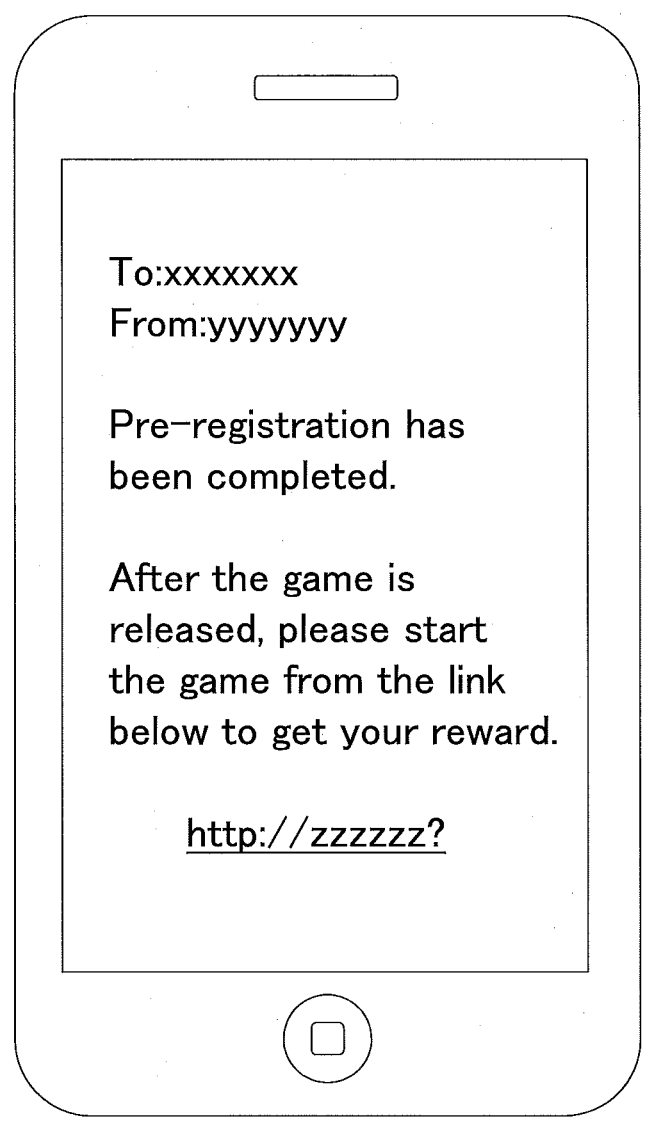
FIG. 16 illustrates an exemplary screen displaying a pre-registration completion notification mail.

FIG. 16 illustrates an exemplary screen displaying a pre-registration completion notification mail. The screen illustrated in FIG. 16 displays a destination "To", a sender "From", and an announcement stating "Pre-registration has been completed. After the game is released, please start the game from the link below to get your reward. http://zzzzzz?" Note that the portion "http://zzzzzz?" displayed at the bottom of the screen of FIG. 16 is an example of a link describing a URL scheme and the like including a character string representing a unique URL for an app for starting a game app.

Note that the pre-registration completion notification may also be provided as a web page to be displayed at the terminal device 1 that is returned to the browser app 11 of the terminal device 1, for example. However, notification by email may be more advantageous in terms of reminding the user that he/she has pre-registered for the game app 14 because email leaves a record.

Referring back to FIG. 15, when the term for accepting pre-registrations ends, the pre-registration server 5 tallies referral incentives based on the registered information (step S313). That is, the pre-registration server 5 tallies the referral IDs and determines the number of people that have pre-registered in response to referrals using the email address identifying the user that has contributed to distributing the referral IDs.

Then, the pre-registration server 5 extracts pre-registration information including at least the campaign code and the reward associated with each app ID from the registered information and provides the extracted information to the game management server 7 (step S314). The pre-registration information is then stored at the game management server 7 (step S315). Note that the pre-registration information may be provided to the game management server 7 online or offline in a suitable data format such as the CSV (Comma Separated Values) data format. Note that in a case where the game management server 7 is configured to query the pre-registration server 5 regarding pre-registration information each time it performs a pre-registration verification in a subsequent step, the step of providing pre-registration information in a batch from the pre-registration server 5 to the game management server 7 may be omitted.

Then, right before the game app 14 corresponding to the pre-registration target is released, the pre-registration server 5 sends a release notification mail to the terminal device 1 based on the registered email address (step S316). The release notification mail has a link embedded therein describing a URL scheme and the like for starting the game app 14 when it is selected and passing the campaign code as a parameter to the game app 14.

Figure 17:
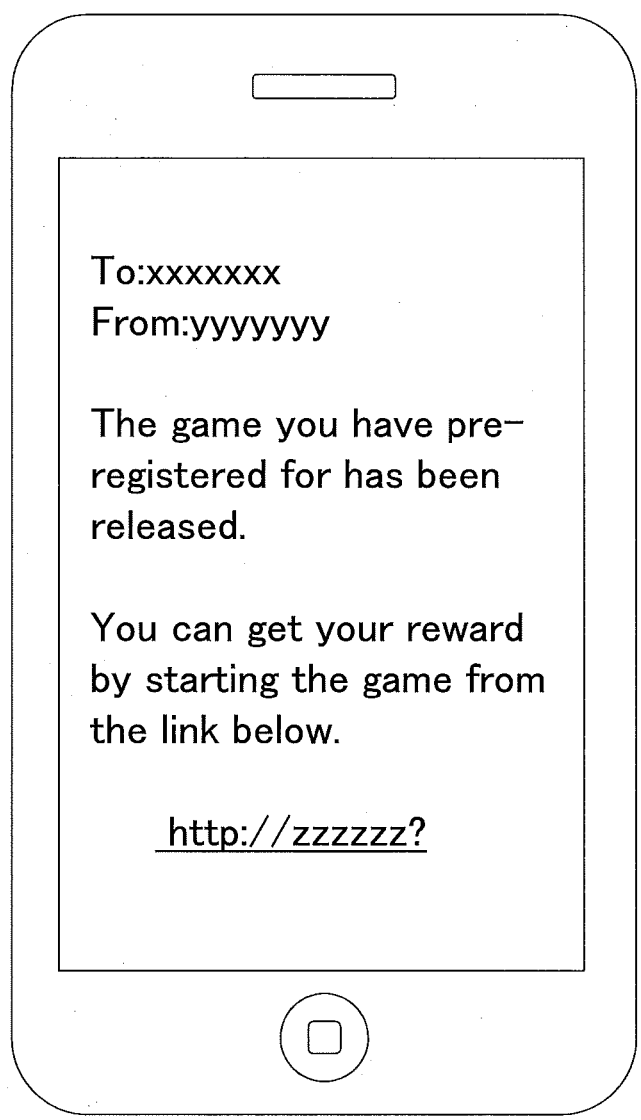
FIG. 17 illustrates an exemplary screen displaying a release notification mail.

FIG. 17 illustrates an exemplary screen displaying a release notification mail. The screen illustrated in FIG. 17 displays a destination "To", a sender "From", and an announcement stating "The game you have pre-registered for has been released. You can get your reward by starting the game from the link below. http://zzzzzz?" Note that the portion "http://zzzzzz?" displayed at the bottom of the screen of FIG. 17 is an example of a link describing a URL scheme and the like including a character string representing a unique URL for an app for starting a game app.

Referring back to FIG. 15, after the game app 14 is released, the user of the terminal device 1 downloads the game app from the application download server 4 (step S317) and installs the game app 14 (step S318).

Then, when the user of the terminal device 1 uses the mail app 12 and selects the link embedded in the release notification mail or the pre-registration completion notification mail (step S319), the game app 14 may be started based on the description including the URL scheme and the like and the campaign code may be passed to the game app 14 at this time (step S320). Note that in a case where an attempt is made to start the game app 14 based on the description including the URL scheme and the like before the game app 14 is downloaded and installed, the game app 14 may be automatically downloaded and installed from the application download server 4, for example. In this case, after the game app 14 is installed and downloaded, the user of the terminal device 1 may have to select the link embedded in the release notification mail or the pre-registration notification mail again.

When the game app 14 is properly started, the game app 14 sends an execution notification including the campaign code and the app ID to the game management server 7 based on a URL of the game management server 7 that is set up within the game app 14 (step S321). Note that in a case where the game management server 7 is a server dedicated to the game app 14, the app ID may be omitted from the execution notification.

Upon receiving the execution notification from the game app 14, the game management server 7 performs a verification to determine whether the campaign code included in the execution notification is included in the pre-registration information acquired from the pre-registration server 5 (step S322).

Then, if the verification is successful, the game management server 7 grants the corresponding reward associated with the campaign code to the game app 14 of the terminal device 1 (step S323). Note that the granting of the reward in the above step may include generating and acquiring reward data used to reflect the reward at the terminal device 1 side, and updating a record of the reward granted in a case where a record is kept as user history, for example. Also, in a case where there is a referral incentive reward in addition to a pre-registration reward, the granting of the reward may include granting the referral incentive reward as well.

Then, the game management server 7 transmits the reward data to the game app 14 of the terminal device 1 (step S324), and in turn, the game app 14 reflects the reward based on the received reward data (step S325). For example, the game management server 7 may add points, add an item, or increase a capacity value by updating game management information.

When the reward is reflected, the game app 14 of the terminal device 1 displays information indicating that the reward has been reflected (step S326). The indication that the reward has been reflected may be substantially identical to that illustrated in FIG. 9.

SUMMARY

As described above, according to an embodiment of the present invention, a user does not have to input a code or the like within a game app, and therefore, a promotion measure using pre-registration may be implemented even in a distribution environment that prohibits a user from inputting a code within a game app, for example.

Although the present invention has been described above with respect to certain illustrative embodiments, the present invention is not limited to these embodiments and numerous variations and modifications may be made without departing from the scope of the present invention. That is, the above description of specific embodiments and the accompanying drawings are provided for illustrative purposes and should not be construed to limit the scope of the present invention.

What is claimed is:

1. A server device, comprising:
   a hardware memory; and
   a hardware processor configured to execute a program, wherein execution of the program causes the processor to implement processes of:
   accepting information that identifies a target application for pre-registration and information that identifies a user from a terminal device;
   registering the accepted information; and
   providing registration information to a management service to perform a verification with respect to the information that identifies the target application and the information that identifies the user after the target application is released, the registration information being provided in a batch or each time the verification is performed,
   wherein
   the information identifying the user includes a user ID managed with respect to a plurality of applications by a user management service;

another application that is different from the target application issues a pre-registration request including the user ID;
the target application that has been released and installed issues an execution notification including the user ID; and
a reward is granted after the verification with respect to the registration information is performed.

2. A server device, comprising:
a hardware memory; and
a hardware processor configured to execute a program, wherein execution of the program causes the processor to implement processes of:
accepting information that identifies a target application for pre-registration and information that identifies a user from a terminal device;
registering the accepted information; and
providing registration information to a management service to perform a verification with respect to the information that identifies the target application and the information that identifies the user after the target application is released, the registration information being provided in a batch or each time the verification is performed,
wherein
the information identifying the user includes an email address;
a browser issues a registration request including the email address;
the target application that has been released and installed issues a login request including the email address; and
a reward is granted after the verification with respect to the registration information is performed.

3. A server device, comprising:
a hardware memory; and
a hardware processor configured to execute a program, wherein execution of the program causes the processor to implement processes of:
accepting information that identifies a target application for pre-registration and information that identifies a user from a terminal device;
registering the accepted information; and
providing registration information to a management service to perform a verification with respect to the information that identifies the target application and the information that identifies the user after the target application is released, the registration information being provided in a batch or each time the verification is performed,
wherein
the information identifying the user includes a unique campaign code that is issued when the information that identifies the target application and the information that identifies the user are accepted;
the campaign code is conveyed to the terminal device in an email as a link including a description for starting the target application and passing the campaign code as a parameter to the target application;
a browser issues a pre-registration request;
the target application that has been released and installed issues an execution notification including the campaign code when the link included in the email is selected and the target application is started; and
a reward is granted after the verification with respect to the registration information is performed.

4. A non-transitory computer-readable medium storing a server program that is executable by a hardware processor of a server device, the server program, when executed, causing the server device to:
accept information identifying a target application for pre-registration and information identifying a user from a terminal device;
register the accepted information; and
provide registration information to a management service for performing a verification with respect to the information identifying the target application and the information identifying the user accepted from the terminal device after the target application is released, the registration information being provided in a batch or each time the verification is performed,
wherein
the information identifying the user includes a user ID managed with respect to a plurality of applications by a user management service;
another application that is different from the target application issues a pre-registration request including the user ID;
the target application that has been released and installed issues an execution notification including the user ID; and
a reward is granted after the verification with respect to the registration information is performed.

5. A non-transitory computer-readable medium storing a server program that is executable by a hardware processor of a server device, the server program, when executed, causing the server device to:
accept information that identifies a target application for pre-registration and information that identifies a user from a terminal device;
register the accepted information; and
provide registration information to a management service to perform a verification with respect to the information that identifies the target application and the information that identifies the user after the target application is released, the registration information being provided in a batch or each time the verification is performed,
wherein
the information identifying the user includes an email address;
a browser issues a registration request including the email address;
the target application that has been released and installed issues a login request including the email address; and
a reward is granted after the verification with respect to the registration information is performed.

6. A non-transitory computer-readable medium storing a server program that is executable by a hardware processor of a server device, the server program, when executed, causing the server device to:
accept information that identifies a target application for pre-registration and information that identifies a user from a terminal device;
register the accepted information; and
provide registration information to a management service to perform a verification with respect to the information that identifies the target application and the information that identifies the user after the target application is released, the registration information being provided in a batch or each time the verification is performed,
wherein
the information identifying the user includes a unique campaign code that is issued when the information that identifies the target application and the information that identifies the user are accepted;

the campaign code is conveyed to the terminal device in an email as a link including a description for starting the target application and passing the campaign code as a parameter to the target application;

a browser issues a pre-registration request;

the target application that has been released and installed issues an execution notification including the campaign code when the link included in the email is selected and the target application is started; and a reward is granted after the verification with respect to the registration information is performed.

\* \* \* \* \*